United States Patent [19]

Thau et al.

[11] Patent Number: 4,652,037
[45] Date of Patent: Mar. 24, 1987

[54] PROTECTIVE COVER FOR A FORK LIFT TRUCK

[76] Inventors: Herbert F. Thau; Allen J. Adler, both of c/o 827 E. New York Ave., Brooklyn, N.Y. 11203

[21] Appl. No.: 663,984

[22] Filed: Oct. 23, 1984

[51] Int. Cl.⁴ .............................................. B60J 7/24
[52] U.S. Cl. .................................... 296/78 R; 296/83
[58] Field of Search ............... 296/78 R, 148, 140, 296/141, 83, 138, 102; 160/368 S, DIG. 4, DIG. 8, DIG. 10, DIG. 18

[56] References Cited

U.S. PATENT DOCUMENTS

| | | | |
|---|---|---|---|
| 1,482,458 | 2/1924 | Brunsman | 296/138 |
| 1,894,527 | 1/1933 | Yengst | 296/138 |
| 2,430,442 | 11/1947 | Acheson | 296/138 X |
| 2,463,646 | 3/1949 | Schassberger | 296/102 X |
| 4,013,315 | 3/1977 | West | 296/83 |
| 4,098,536 | 7/1978 | Mills | 296/78 R |
| 4,133,574 | 1/1979 | Martin | 296/147 X |
| 4,179,152 | 12/1979 | Kent, Jr. | 296/141 X |
| 4,220,298 | 9/1980 | Willis | 296/148 X |

Primary Examiner—Robert B. Reeves
Assistant Examiner—Russell D. Stormer
Attorney, Agent, or Firm—Helfgott & Karas

[57] ABSTRACT

A protective cover for the cab portion of a fork lift truck. The cab being defined by a frame having corner posts upstanding from the truck body and supporting the roof. The cover includes a top panel which overlies the roof and further includes front, rear, and side wall panels depending from the top panel secured thereto as well as to each other by edge seams. The side panels include roll up doors and the front and rear panels include windows. Flaps are provided over the windows. Straps depend from the top panel interiorly of the doors and flaps. The doors and flaps can be exteriorly rolled up with the straps wrapping around them and secured onto fasteners provided on the top panel so as to hold the doors and windows in an open condition.

8 Claims, 7 Drawing Figures

PROTECTIVE COVER FOR A FORK LIFT TRUCK

BACKGROUND OF THE INVENTION

This invention relates to protective covers and, more particularly, to a cover for the cab portion of a fork lift truck.

Fork lift trucks are regularly utilized for industrial use such as warehousing, loading, construction, and other needs. The fork lift truck typically includes a truck body portion and a cab portion above the truck body. The driver generally sits in the cab portion and manipulates and drives the fork lift truck. Typically, the cab portion includes a roof which is supported by four upstanding corner posts projecting from the truck body.

The cab portion of the fork lift truck is usually open. As a result, during inclement weather it is difficult to operate the fork lift truck. The cold, rain, snow, and other inclement weather conditions provide very adverse conditions for the driver. Even when the fork lift truck is utilized indoors, certain warehouses may be insufficiently heated, again providing difficulty to the driver of the fork lift truck to operate under such cold conditions.

Although a cover could be thrown over the cab portion, the cover must be such as to permit the driver to view out of the cab portion. In fact, such viewing should be not only in front of the driver, but he should be able to see on all sides in order to avoid safety hazards. Furthermore, the driver should be able to use the cover not only during inclement weather but it should be usable during good weather. This will avoid the need to continuously install and remove the cover depending on weather conditions and environmental temperature.

SUMMARY OF THE INVENTION

Accordingly, it is an object of the present invention to provide a protective cover for a fork lift truck.

Another object of the present invention is to provide a protective cover for the cab portion of a fork lift truck.

Yet a further object of the present invention is to provide a protective cover for the cab portion of a fork lift truck, which cover can be utilized to protect the driver against inclement weather condition, while maintaining safety and comfort within the cab portion.

Still another object of the present invention is to provide a protective cover for the cab portion of a fork lift truck, which cover can be used to retain engine heat within the cab portion so as to prevent external low temperatures from detrimentally effecting the operator of the fork lift truck.

Still a further object of the present invention is to provide a protective cover for the cab portion of a fork lift truck which permits opening and closing of the doors of the cover from both inside and outside of the cab.

Another object of the present invention is to provide a protective cover for the cab portion of a fork lift truck, which cover permits adjustment of the windows and doors to a position which suits the operator's needs.

Briefly, in accordance with the present invention, there is provided a protective cover for the cab portion of a fork lift truck. The cab itself is defined by a frame having four corner posts upstanding from a truck body which posts support a roof. The cover includes a top panel for overlying the roof. Depending front, rear, and side wall panels are included. Edge seams interconnct the panels into an open-bottom enclosure for fitting onto the frame. At least one roll-up door panel is cut into a side wall panel for permitting entry and exit from the enclosure. An appropriate fastener, such as a zipper, permits opening and closing of the door panel. The zipper is provided with a double sided puller to permit opening and closing of the zipper from both the inside and outside of the enclosure.

A pair of straps are provided which freely depend from an upper-edge seam of the enclosure. The straps are positioned adjacent to the door panel, interiorly thereof. With the door panel exteriorly rolled up, the straps can wrap around the rolled up door panel. By placing opposite portions of a Velcro loop pile fastener at the distal edges of the straps and on the outside of the roof panel, the straps can be secured in place to hold up the door at any desired appropriate height, as the operator requires.

By placing magnetic strips along the lower edge of the cover, the cover can be held in place onto the truck body.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWING

In the drawings.

In the various figures of the drawing like reference characters designate like parts.

DESCRIPTION OF THE PREFERRED EMBODIMENT

Figure 1:
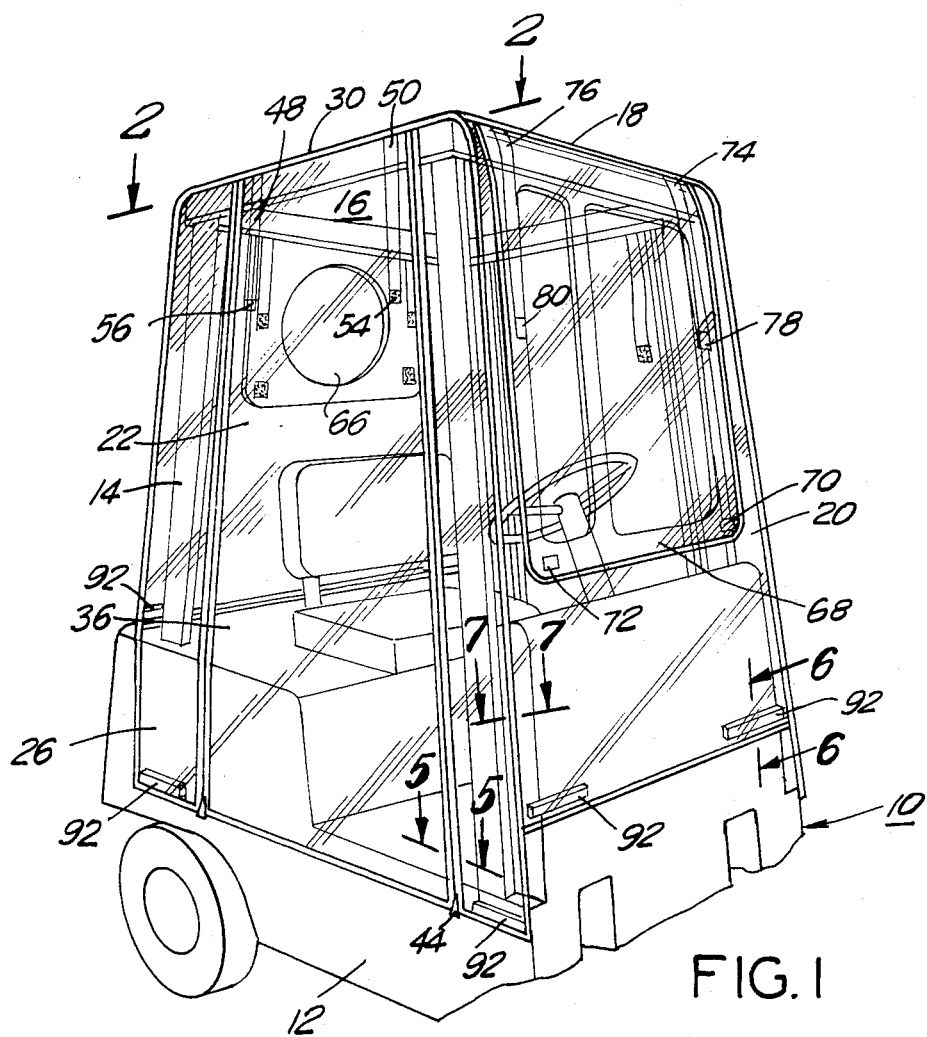
FIG. 1 is a perspective view of the protective cover of the present invention mounted on the cab portion of the fork lift truck.
Figure 2:
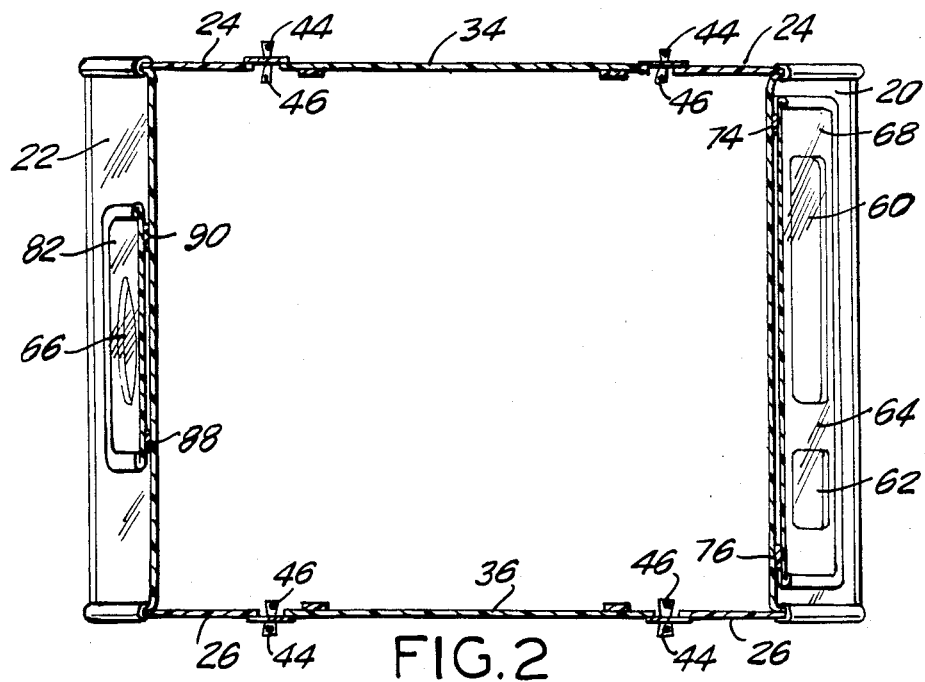
FIG. 2 is a cross sectional view taken along lines 2—2 of FIG. 1, and specifically just below the roof panel of the protective cover.

Referring now to the drawings, the present invention finds use in a fork lift truck, shown generally at 10, comprising a truck body portion 12 forming the base of the truck 10 and including the wheels, the chassis, etc. Upstanding from the truck body 12 are four corner posts or beams 14 which support the roof 16 of the fork lift truck. The beams 14 and roof 16 define a cab portion which can include a seat, steering wheel, and other controls for use by the operator.

Typically, the cab portion is open and, accordingly, the operator is exposed to all of the environmental conditions including heat, cold, rain, and other detrimental effects of the weather.

Figure 7:
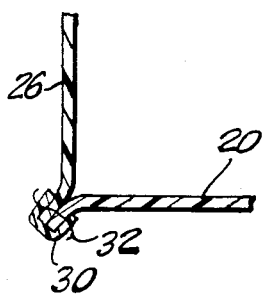
FIG. 7 is a cross sectional view taken along line 7—7 of FIG. 1, and specifically showing an edge seam.

The present invention provides for a protective cover for such cab portion. The protective cover includes a substantially rectangular roof panel 18 from which depend a front wall panel 20, a rear wall panel 22 and opposing side panels 24, 26. The individual side panels are slightly wider at the bottom than at the top to accommodate the particular shape provided on fork lift truck. The panels are interconnected by means of edge seams 30 along top perimiter, as well along the vertical side edge portions. As best shown in FIG. 7, the edge seam 30 includes appropriate switching 32 which interconnects two adjacent panels, typically shown as the front panel 20 and the side panel 26. For convenience, the seams can be made with weather durable Dacron welting and sewn with unbreakable nylon thread.

On the two side panels, there are provided door panels 34, 36. Each of the door panels are formed by vertical cuts in the side wall panels extending from the lower distal edge and terminating adjacent the upper roof edge seam. These opposing vertical cuts are interconnected by means of fastening means, such as zippers.

Figure 5:
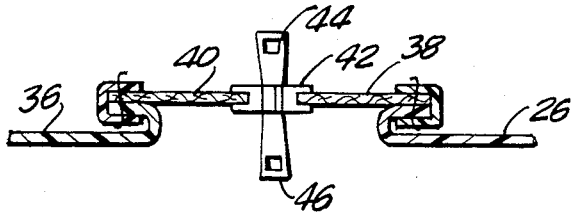
FIG. 5 is a cross sectional view taken along line 5—5 of FIG. 1, and specifically through the zipper and showing the double sided pullers.

As best shown in FIG. 5, the side door panel 36 is interconnected at one side thereof with the side wall panel 26 by means of the zipper. The zipper is formed of opposing side sections 38, 40 of material such as Dacron, which side sections are connected to the actual zipper 42. Double pullers 44, 46 are provided on the zipper to permit the doors to be opened or closed from both the inside as well as the outside fo the cover. The zippers themselves can be heavy duty nylon marine zippers which are rust-proof, self-lubricating, and long lasting.

With the zippers as provided, each of the doors 34, 36 can be opened from both the inside or the out, as desired. For example, they can be opened from the outside, permitting the operator to enter the cab. They can then be closed from the inside, to provide protection for the operator.

Figure 4:
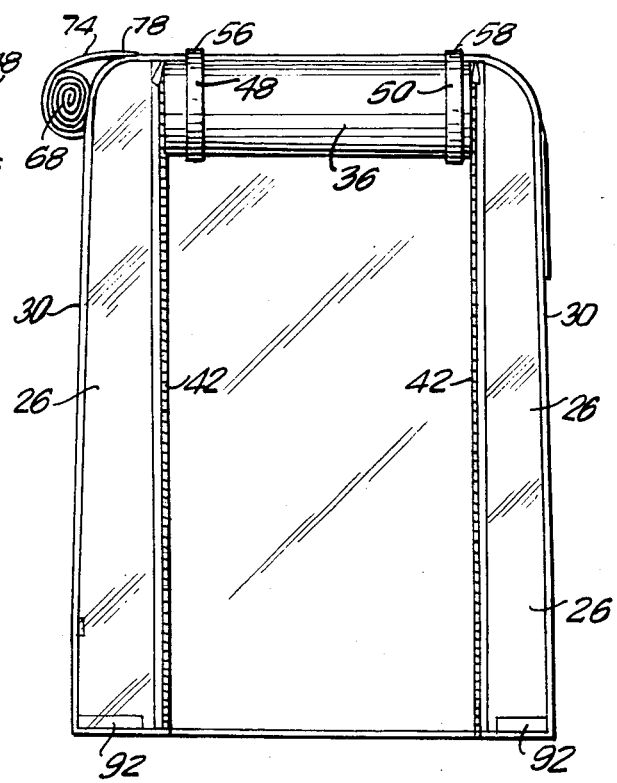
FIG. 4 is a side elevational view of the panel, and showing the door panel rolled up and held in place and the rear window panel rolled up and held in place.

Internally of the doors, there are provided a pair of spaced apart depending straps 48, 50 which are secured from the upper edge seam 30. At the lower distal edges of these straps 48, 50 are respectively placed tabs 52, 54 of one part of a loop pile fastener material, typically known as a Velcro fastener. Pads 56, 58 of the corresponding portions of the loop pile fastener are placed on the roof, adjacent the edge to which the straps are connected, as best shown in FIG. 4. In this manner, the door 36 can be unzipped and rolled up exteriorly of the enclosure. The strips 48, 50 can then be wrapped around the outside of the rolled up door 36 and the corresponding opposing tabs 52 attached to the pads 56 on the roof so as to secure the rolled up portion in place. With the arrangement as shown, the height of the door can be suitably adjusted, so as to permit the door to be rolled up to any height as required by the operator.

The front wall 20 and the rear wall 22 can also include windows. By way of example, the front wall is shown to include two windows 60, 62 with the window 60 being shown as the larger of the two windows and the two windows being separated by a median strip 64 forming part of the front wall panel 20. A single circular window 66 is shown being in the rear panel 22.

A flap 68 secured onto the front wall panel is sewn within the upper edge seam and overlies the front windows 60, 62. The flap 68 is held in place covering the windows by means of opposing pairs of Velcro loop pile fasteners 70, 72. One pad of the fastener material would be placed on the flap 68 and the opposing part would be placed directly on the front panel 20.

Figure 3:
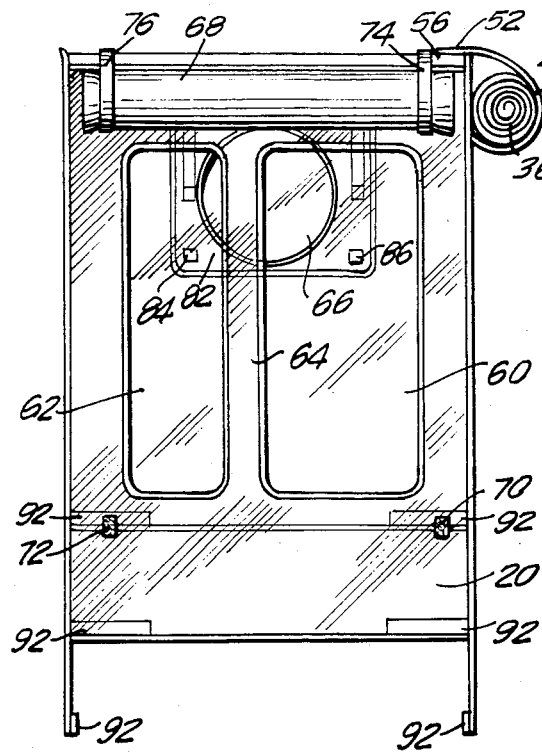
FIG. 3 is a front view of the protective cover showing the right side door panel rolled up and held in place and the front window panel rolled up and held in place.

A pair of spaced apart flaps 74, 76 are also provided interiorly of the front panel 68 and also secured by being sewn within an upper edge seam. At the distal ends of these strips are again provided one part of the mating loop pile fastener material 78, 80 with the opposing part being provided upon the roof. Accordingly, as best shown in FIGS. 3 and 4, with the front panel 68 rolled up exteriorly, the strap 74 can be secured in place by means of the loop pile fastener material 78 at the distal end of the strap which attaches to the mating piece at the top of the roof.

In a similar manner, a flap 82 is provided to cover the rear window, which also includes tabs of loop pile fastener material 84, 86 to secure it downwardly in place. A pair of opposing straps 88, 90 are provided to hold the rear flap 82 in rolled up condition to expose the rear window 66.

Accordingly, both doors and windows can be retained closed in order to protect the operator from the external conditions. At the same time, as desired, these flaps and doors can be opened up so that the enclosure can remain in place on the fork lift truck even when weather conditions permit the operator to be exposed to the environment. The entire enclosure need not be removed but can remain permanently situated in place regardless of the weather conditions or external environmental factors.

In order to assist in maintaining the enclosure in place, magnetic strips 92 can be sewn or secured in place. Typically, the magnetic tape can be sealed into the bottom edges at spaced locations, or in a continuous strip along the bottom edges. These magnetic tapes will secure the cover onto the truck body.

Figure 6:
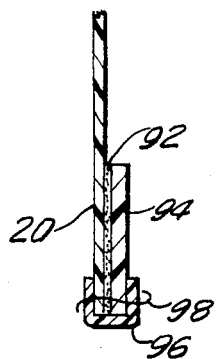
FIG. 6 is a cross sectional view through line 6—6 of FIG. 1, and showing the integral magnetic strips.

As best shown in FIG. 6, the magnetic tape 92 can be secured in place by folding over a hem of the panel 20 so as to form an inner layer 94 sandwiching the magnetic tape 92 therebetween. A edge cover 96 can be sewn in place with the stitching 98 in order to protect the lower edging of the enclosure.

The entire enclosure can be made of 100% virgin vinyl for greater durability and window-clear visibility. Additionally, vinyl will not support combustion. The material also provides adequate insulation for retaining the heat generated by the truck body engine so as to retain the heat within the cabin enclosure and seal out the cold. In this manner, the cover can be used in warehouses not having its own heat as well as outdoors during the cold weather.

All edges around the area can be hemmed to prevent tears. Such edges can also be formed around the window ledges. The protective cover itself is easy to manufacture and at the same time provides rugged and durable protection for use.

There has been disclosed heretofore and best embodiment of the invention presently contemplated. However, it is to be understood that various changes and modifications may be made thereto without departing from the spirit of the invention.

We claim:

1. A removable cover for a cab portion of a fork lift truck, the cab being defined by a frame having four corner posts upstanding from a truck body and supporting a roof, said cover comprising a top panel for freely and unattached overlying of the roof, depending front and rear wall panels and side wall panels, edge connectors interconnecting said panels into an open-bottom enclosure for fitting onto the frame, at least one roll-up door panel cut into a side wall panel permitting entry and exit from the enclosure, said door panel being defined by a pair of spaced apart vertical cuts upwardly extending from the lower edge of the wall panel and inwardly from the corner edges of the side wall panel to leave intact lateral portions of the side wall panel on either side of the door panel to form a wrap around of the cover on the side having the door panel, fastener means for opening and closing of said door panel and including means for operating said fastener means from both within said enclosure and from outside of said enclosure comprising a respective elongated zipper spanning said cuts, and a double sided puller operating each of said zippers to permit opening and closing of the zippers from both the inside and outside of the enclosure, securing means for retaining said door in its open position, retaining means for retaining the lower edge of the front and rear panels and the lateral portions of the side wall panel secured to the truck body, and further comprising at least one window cut out from a portion of said front wall panel, and additional layer forming a flap of wall material depending from an upper edge seam and overlying said window, and coupling means for securing said overlying flap onto said front wall panel, said coupling means comprising at least one strip of one part of loop pile fastener material secured onto a distal edge of said overlying flap and a strip of the mating part of the loop pile fastener material secured onto the front wall panel, and further comprising a pair of straps depending from said upper edge seam of the enclosure, said straps being positioned adjacent said overlying flap, exteriorly of said front wall panel and interiorly of said overlying flap, a tab of one part of loop pile fastener respectively coupled at the distal ends of said straps and a pad of said mating part of the loop pile fastener respectively secured onto the exterior of the top panel aligned with said straps, whereby said overlying flap can be exteriorly folded part way up to the top panel and the distal edge of the flap secured directly to the pad on the top panel, and with said overlying flap exteriorly fully rolled up, said straps can wrap around the rolled up flap and said tabs matingly engage their respective aligned pads to retain said window in an open condition.

2. A cover for the cab portion of a fork lift truck as in claim 1, and comprising upper edge seams connecting the roof to the other panels, and further comprising a pair of straps freely depending from an upper edge seam of the enclosure, said straps being positioned adjacent to said door panels and interiorly thereof, a tab of one part of a loop pile fastener respectively coupled at the distal ends of said straps, and a pad of the mating part of the loop pile fastener respectively secured onto the exterior of the roof panels aligned with said straps, whereby with said door panel exteriorly rolled up, said straps can wrap around the rolled up door and said tabs matingly engage their respective aligned pads to retain said rolled up door panel in its open condition.

3. A cover for a cab portion of a fork lift truck as in claim 2, wherein said tabs are positioned on said roof panel adjacent to said upper edge seam.

4. A cover for the cab portion of a fork lift truck as in claim 1, wherein said cover including said wall panel, said doors, and said flaps, are all formed of a transparent material.

5. A cover for the cab portion of a fork lift truck as in claim 4, wherein said material comprises clear vinyl.

6. A cover for the cab portion of a fork lift truck as in claim 1, and comprising at least one magnetic strip coupled to the lower distal edge of each of said front, rear, and side wall panels to hold the cover to the truck.

7. A cover for the cab portion of a fork lift truck as in claim 6, wherein said magnetic strip comprises magnetic tape sealed into the bottom of said wall panels.

8. A cover for the cab portion of a fork lift truck as in claim 5, wherein said vinyl material is an insulator as to retain engine heat within the cab.

* * * * *